US011556851B2

(12) United States Patent
Witztum et al.

(10) Patent No.: US 11,556,851 B2
(45) Date of Patent: Jan. 17, 2023

(54) ESTABLISHING A COMMUNICATION SESSION BETWEEN CLIENT TERMINALS OF USERS OF A SOCIAL NETWORK SELECTED USING A MACHINE LEARNING MODEL

(71) Applicant: salesforce.com, inc., San Francisco, CA (US)

(72) Inventors: Noa Witztum, San Francisco, CA (US); Ofer Bachner, San Francisco, CA (US); Dima Volski, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 534 days.

(21) Appl. No.: 16/777,915

(22) Filed: Jan. 31, 2020

(65) Prior Publication Data
US 2021/0241163 A1    Aug. 5, 2021

(51) Int. Cl.
| | | |
|---|---|---|
| *G06Q 20/00* | (2012.01) | |
| *G06N 20/00* | (2019.01) | |
| *G06F 16/28* | (2019.01) | |

(52) U.S. Cl.
CPC ........... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| | | | | |
|---|---|---|---|---|
| 9,563,688 | B2 * | 2/2017 | Alkov ..................... | H04L 51/00 |
| 10,186,255 | B2 * | 1/2019 | Tapuhi ................... | G06N 20/00 |
| 10,909,145 | B2 * | 2/2021 | Modarresi ............. | G06F 16/285 |

OTHER PUBLICATIONS

Bostani, Elsevier, 2017, pp. 56-72.*
Can, 2019, Elsevier, pp. 1-38.*
Faralli, 2017, Elsevier, pp. 23-40.*
Zhou, Elsevier, 2017, pp. 46-57.*

* cited by examiner

*Primary Examiner* — Waseem Ashraf
*Assistant Examiner* — Michael I Ezewoko

(57) ABSTRACT

There is provided a method, comprising: extracting user feature profiles for users of a social network, each feature profile being structured and including user features extracted from unstructured user generated text, indications of participation in groups, and structured user profiles, training a clustering-component of a model to cluster the feature profiles, training a matching-component of the model to compute a distance score indicative of statistical similarity between a feature profile of a target user and features profiles of other users of a same cluster, using a training dataset of pairs of feature profiles extracted from common clusters, each pair assigned a distance score label, providing the model for: identifying a certain cluster of a certain user, and computing distance scores between the feature profile of the certain user and other feature profiles of other users of the certain cluster for selecting one user for establishment of a communication session.

16 Claims, 3 Drawing Sheets

ESTABLISHING A COMMUNICATION SESSION BETWEEN CLIENT TERMINALS OF USERS OF A SOCIAL NETWORK SELECTED USING A MACHINE LEARNING MODEL

BACKGROUND

Some embodiments relate to machine learning models and, more specifically, but not exclusively, to systems and methods establishing a communication session between users of a social network selected using a machine learning model.

A social network may include thousands of users. Each user posts data to a personal page, and/or participates in chat sessions created around a certain topic and/or has a personal profile that may be viewed by others users of the social network.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of some embodiments. In this regard, the description taken with the drawings makes apparent to those skilled in the art how some embodiments may be practiced.

In the drawings.

DETAILED DESCRIPTION

Figure 1:
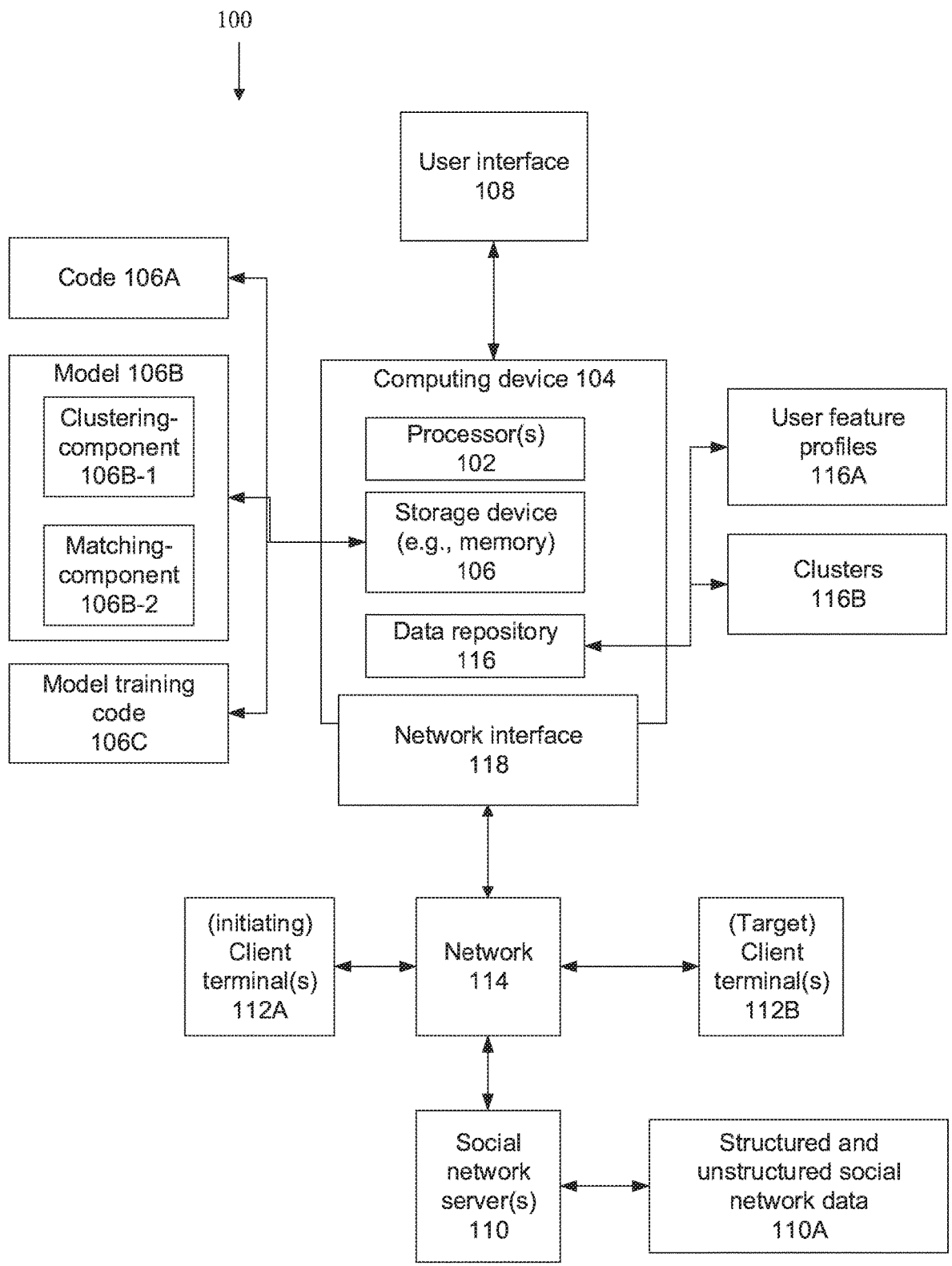
FIG. 1 is a block diagram of components of a system for matching users based on user feature profiles created using unstructured and/or structured data extracted from a social network and/or for training a model for computing scores denoting similarity between two user feature profiles, in accordance with some embodiments.

According to a first aspect, a computer implemented method for training a machine learning model for establishing a communication session, comprises: extracting a plurality of user feature profiles for a plurality of users of a social network hosted by at least one social network server, each user feature profile being structured and including a plurality of user features extracted from unstructured user generated text, indications of participation in groups, and structured user profiles, training a clustering-component of the model to cluster the plurality of user feature profiles, training a matching-component of the model to compute a distance score indicative of statistical similarity between a feature profile of a target user and features profiles of other users of a same cluster, using a training dataset of pairs of user feature profiles extracted from common clusters, each pair assigned a distance score label, providing the model for: identifying a certain cluster of a certain user, and computing distance scores between the user feature profile of the certain user and other user feature profiles of other users of the certain cluster for selecting a subset of the other users, wherein the communication session is established between an initiating client terminal of the certain user and the target client terminal of a user selected by the initiating client terminal from the subset.

According to a second aspect, a computer implemented method for establishing a communication session between an initiating client terminal and a target client terminal selected by a trained machine learning model, comprises: receiving a request from an initiating client terminal of a certain user of a social network hosted by at least one social network server, accessing a certain cluster computed by a clustering-component of the model, the certain cluster storing feature profiles of the certain user and other users of the social network, each user feature profile being structured and including a plurality of user features extracted from unstructured user generated text, indications of participation in groups, and structured user profiles, computing, by a matching-component of the model, a distance score indicative of statistical similarity between a feature profile of the certain user and the features profiles of other users included in the certain cluster, receiving, from the initiating client terminal, a selection of one of a subset of the other users, and establishing the communication session between the initiating client, and the target client terminal of the selected one user.

According to a third aspect, a system for training a machine learning model for establishing a communication session, comprises: at least one hardware processor executing a code for: extracting a plurality of user feature profiles for a plurality of users of a social network hosted by at least one social network server, each user feature profile being structured and including a plurality of user features extracted from unstructured user generated text, indications of participation in groups, and structured user profiles, training a clustering-component of the model to cluster the plurality of user feature profiles, training a matching-component of the model to compute a distance score indicative of statistical similarity between a feature profile of a target user and features profiles of other users of a same cluster, using a training dataset of pairs of user feature profiles extracted from common clusters, each pair assigned a distance score label, providing the model for: identifying a certain cluster of a certain user, and computing distance scores between the user feature profile of the certain user and other user feature profiles of other users of the certain cluster for selecting a subset of the other users, wherein the communication session is established between an initiating client terminal of the certain user and the target client terminal of a user selected by the initiating client terminal from the subset.

In a further implementation form of the first, second, and third aspects, the distance score label of each pair is computed as a statistical distance indicative of correlation score between the feature profiles of the users of the respective pair, or assigned a value denoting a maximal distance score provided by one of the users of the respective pair, or assigned a value denoting minimal distance score provided by one of the users of the respective pair.

In a further implementation form of the first, second, and third aspects, further comprising, after establishing the communication session, obtaining an indication of the distance score from the initiating client terminal for update of the label of the respective pair, and updating the matching-component of the model.

In a further implementation form of the first, second, and third aspects, further comprising: receiving from the initiating client terminal, an indication of no selection of the subset of the other users included in the certain cluster, updating labels of pairs of the certain user and each of the subset of the other users with an indication of a maximal distance score, updating the clustering-component and matching-component of the model with the updated labels of the pairs, computing updated clusters by the updated clustering-component, computing updated distance scores by the updated matching-component, and receiving a new selection of a new subset of other users included in a new certain cluster presented on the initiating client terminal.

In a further implementation form of the first, second, and third aspects, the clustering-component is trained to cluster user feature profiles according to a selected target subset of user features and to not cluster the user feature profiles according to a selected variable subset of user features.

In a further implementation form of the first, second, and third aspects, the target subset of the user features are selected from the group of: words extracted from an employee title, department, business unit, and country, user identification profile, ranking in the social network, membership in groups of the social network, and words extracted from personal posted text, and wherein the selected variable subset of user features include personal interests.

In a further implementation form of the first, second, and third aspects, each user feature profile is labelled with a label obtained from the selected target subset of the user features.

In a further implementation form of the first, second, and third aspects, the user feature profiles are clustered using a k-means clustering model implementation of the clustering-component having a plurality of adjustable parameters that are set during the training of the clustering-component, and wherein the matching-component is implemented based on a regression model.

In a further implementation form of the first, second, and third aspects, the plurality of adjustable parameters include wherein a number of clusters selected from the range 500-550 when a number of user features profiles is 40000-50000.

In a further implementation form of the first, second, and third aspects, features extracted from structured user profiles are selected from the group of: department, role, job profile, and geographic location.

In a further implementation form of the first, second, and third aspects, features extracted from an analysis of at least one of: unstructured user generated content posted on personal pages of the social network by users, members of users in special interest groups of the social network, and structured user profiles, are selected from the group of: seniority, organization level distance, title, department, job description, author style, topic modelling, and expertise level and/or personal interest level.

In a further implementation form of the first, second, and third aspects, at least one feature of the feature profile is computed from an analysis of membership in special interest groups of the social network is selected from the group of: unstructured activity in each respective group, number of posts in each respective group, administrator status in groups, number of likes posted in each respective group, and number of group related keywords used in posts in the respective groups.

In a further implementation form of the first, second, and third aspects, the feature profiles include a feature indicative of a seniority and expertise level of the respective user computed by a heuristic mapping of words extracted from an employee title associated with a profile of the respective user posted on the social network.

In a further implementation form of the first, second, and third aspects, the extracting, the training the clustering-component, the training the matching-component, and the providing the model are iterated at spaced apart time intervals for dynamically updating the model using updated user features.

In a further implementation form of the first, second, and third aspects, further comprising receiving from the initiating client terminal a target value of a certain user specific parameter, and wherein the statistical similarity is computed by matching user feature profiles of the cluster to the certain user specific parameter.

In a further implementation form of the first, second, and third aspects, the distance score of each pair is computed as a statistical distance indicative of correlation score between the feature profiles of the users of the respective pair, or assigned a value denoting a maximal distance score provided by one of the users of the respective pair, or assigned a value denoting minimal distance score provided by one of the users of the respective pair.

In a further implementation form of the first, second, and third aspects, further comprising, after establishing the communication session, obtaining an indication of the distance score from the client terminal for update of the label of the respective pair, and updating the matching-component of the model.

In a further implementation form of the first, second, and third aspects, further comprising: receiving from the initiating client terminal, an indication of no selection of the subset of the other users included in the certain cluster, updating labels of pairs of the certain user and each of the subset of the other users with an indication of a maximal distance score, updating the clustering-component and matching-component of the model with the updated labels of the pairs, computing updated clusters by the updated clustering-component, computing updated distance scores by the updated matching-component, and receiving a new selection of a new subset of other users included in a new certain cluster presented on the initiating client terminal.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to machine learning models and, more specifically, but not exclusively, to systems and methods establishing a communication session between users of a social network selected using a machine learning model.

An aspect of some embodiments of the systems, methods, apparatus, and/or code instructions (stored on a memory and executable by one or more hardware processors) relate to training a machine learning model for computing distance scores indicative of similarity between profiles of users of a social network, for matching two users of the social network. A communication session may be established between client terminals of the similar users. User feature profiles are extracted for multiple users of a social network hosted by social network server(s). Each user feature profile is structured and includes multiple user features extracted from unstructured user generated text (e.g., content typed by the user and posted on their personal profile), indications of participation in groups (e.g., special interest interactive groups of multiple users of the social network), and structured user profiles (e.g., name, position, geographic location). A clustering-component of the model is trained to cluster the user feature profiles. The clustering-component may be trained, for example, by selecting a certain number of clusters and/or by selecting which user features of the user feature profile to use for clustering. Optionally, the clustering is unsupervised. A matching-component of the model is trained to compute a distance score indicative of statistical similarity between a feature profile of a target user and features profiles of other users of the same cluster. The matching-component is trained using a training dataset of pairs of user feature profiles extracted from common clusters, each pair assigned a distance score label. The user features used for computation of the distance score may be selected and/or assigned different weights. Pairs of users that are considered more similar may be assigned lower distance scores in comparison to pairs of users that are considered less similar. The trained model is provided for identifying a certain cluster of a certain user (e.g., in response to a user issued request), using the clusters created by the trained clustering-component. Distance scores between the user feature profile of the certain user and other user feature profiles of other users of the certain cluster are computed by the trained matching-component. The distance scores may be used for selecting a subset of the other users of the cluster. For example, the users are ranked (e.g., starting from lowest distance score indicating the best match) according to distance scores, and the top 3 (or other number) of best ranked users are presented to the initiating user for selection of one user. A communication session, for example, an instant-messaging application and/or video conference call, may be established between an initiating client terminal of the certain user and the target client terminal of the user selected by the initiating client terminal from the subset.

An aspect of some embodiments of the systems, methods, apparatus, and/or code instructions (stored on a memory and executable by one or more hardware processors) relates to computing distance scores indicative of similarity between profiles of users of a social network using a trained machine learning model, for matching two users of the social network. A communication session may be established between an initiating client terminal and a target client terminal of the users corresponding to the matched user profiles. A request is received from an initiating client terminal of a certain user of a social network hosted by a social network server(s). A certain cluster computed by a clustering-component of the model is accessed. The certain cluster stores feature profiles of the certain user and other users of the social network. Each user feature profile is structured, including user features extracted from unstructured user generated text, indications of participation in groups, and structured user profiles. A matching-component of the model computes a distance score indicative of statistical similarity between a feature profile of the certain user and the features profiles of other users included in the certain cluster. A subset of users having best scores (e.g., lowest ranking scores) indicating best matches may be presented on the initiating client terminal. A selection of one user of presented subset is made by the user. The communication session is established between the initiating client and the target client terminal of the selected user.

At least some of the systems, apparatus, methods, and/or code instructions described herein relate to the technical problem of matching a target user of a social network to an initiating for establishment of a communication session therebetween, for example, a target user to act as a mentor for an initiator user, where both users are members of a certain organization, for example, employees of a large corporation, healthcare providers in a healthcare facility, and/or volunteers in a non-profit organization.

At least some of the systems, apparatus, methods, and/or code instructions described herein improve the technical field of searching social networks, which include unstructured user posted data, structured user posted data, and user activity in groups, to identify a target user that matches (i.e., is similar to) an initiating user. The target user and initiating user may be connected by establishing a communication session between the initiating client terminal of the initiating user and a target client terminal of the target user.

At least some of the systems, apparatus, methods, and/or code instructions described herein improve the interaction of the initiating user with a computing device. Using standard methods, the user uses standard search engines to search over a large number of users of the social network to try to find one matching user. Such searches are tedious, requiring the user to manually enter different key words into the search engine for iterative searching, and/or manually review many profiles to try to find a matching user. In contrast, at least some of the systems, apparatus, methods, and/or code instructions described herein provide an enhanced user interactive experience, by performing the matching process for the user, and presenting the user with a short list of the best matches. The user may select one match from the short list.

At least some of the systems, apparatus, methods, and/or code instructions described herein improve the computing device that matches the initiating user with a target user, and/or to the network, for establishing the communication session therebetween. The improvement is based on decreased processor utilization, and/or decreased processing time and/or decreased network utilization, arising from the increased efficiency in locating the target user in comparison to standard method of multiple iterative brute force searches to try and select the best key words to use to search for others users, and then iteratively accessing the different profiles to find the best match.

Users post structured and non-structured data to their user profiles hosted by the social network, and/or may participate in groups of the social network (e.g., chat discussions on special interest topics). When the initiating user searches for the target user using the social network, the initiating user encounters a challenge—to determine how to search for the suitable target user, and/or how to sort through the large number of possible search results in order to find the suitable target user. The nature of the data of the social network, which includes structured user posted data, unstructured user posted data, and user activity in groups, makes such searches tedious, time consuming, and unreliable in being able to find the relevant target user, for example, a suitable mentor for the initiating user.

The improvement to the technical field, and/or the solution to the technical problem is based and/or improvement to the computing device is based on the trained model, which is designed for computationally efficient and/or accurate matching of user profiles. The trained model includes a cluster-component that clusters (e.g., for all) users of the social network into multiple clusters. Each cluster represents a first level of similarity between users. For any user of a cluster, other users within the same cluster represent similar users, in comparison to users of another cluster. The clusters are created in advance receiving a request from any a particular user, for example, off-line. The matching-component, which represents a second level of similarity between users, is trained to find others users within the same cluster that are most similar to the initiating user. The matching-component is trained in advance of receiving the request, for example, off-line, but is executed in real-time, triggered by the received request from the user. The initiating user may be presented with a small list of the most similar users for establishing the communication session between one target user selected by the initiating user. The model may be updated using user feedback that indicates whether the matches found by the model are suitable or not.

Before explaining at least one embodiment in detail, it is to be understood that the embodiment(s) is not necessarily limited in its application to the details of construction and the arrangement of the components and/or methods set forth in the following description and/or illustrated in the drawings and/or the Examples. The embodiment(s) is capable of other embodiments or of being practiced or carried out in various ways.

Embodiments may be implemented as a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects.

Aspects are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
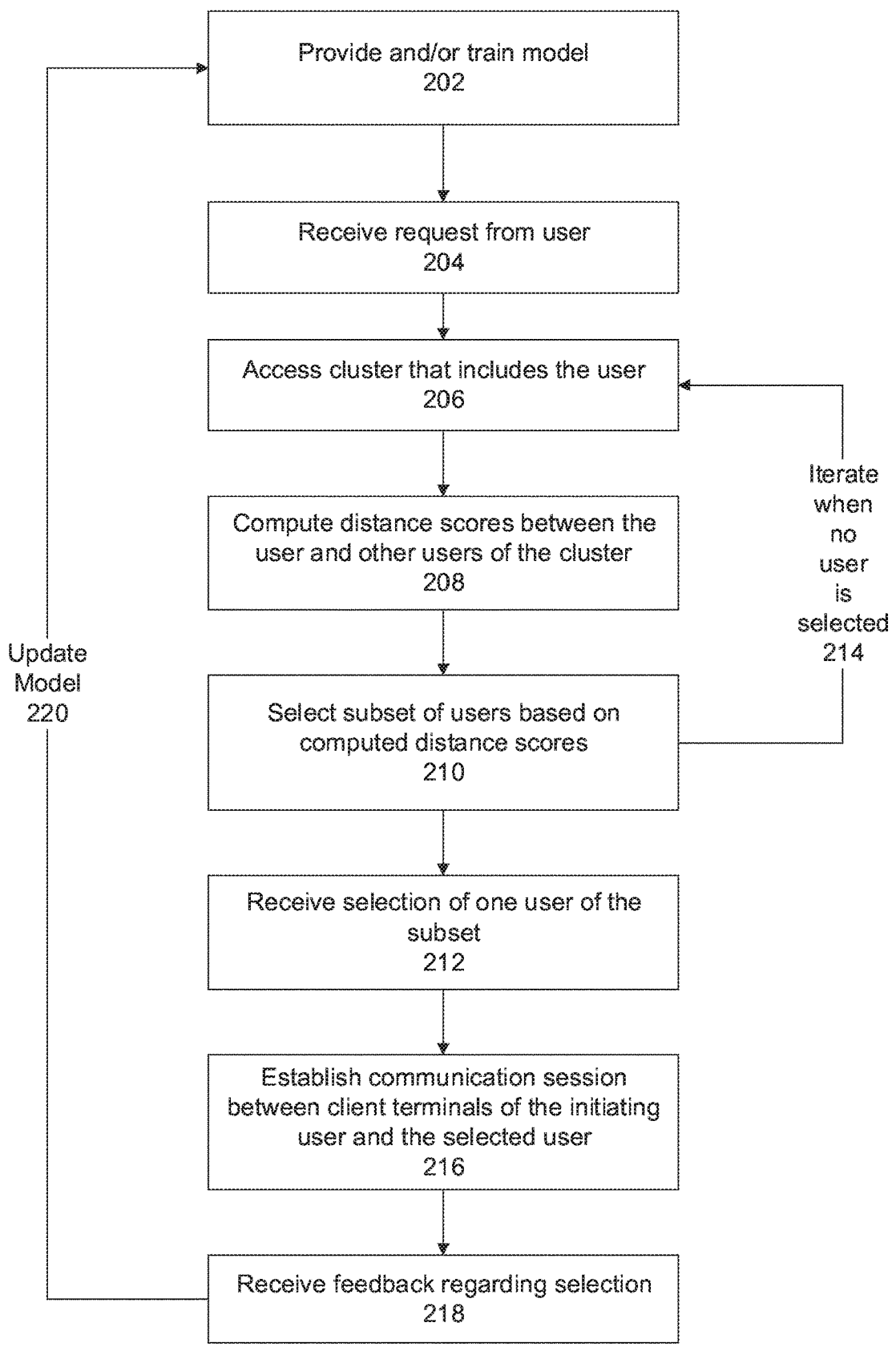
FIG. 2 is a flowchart of a method for matching users based on user feature profiles created using unstructured and/or structured data extracted from a social network, in accordance with some embodiments.
Figure 3:
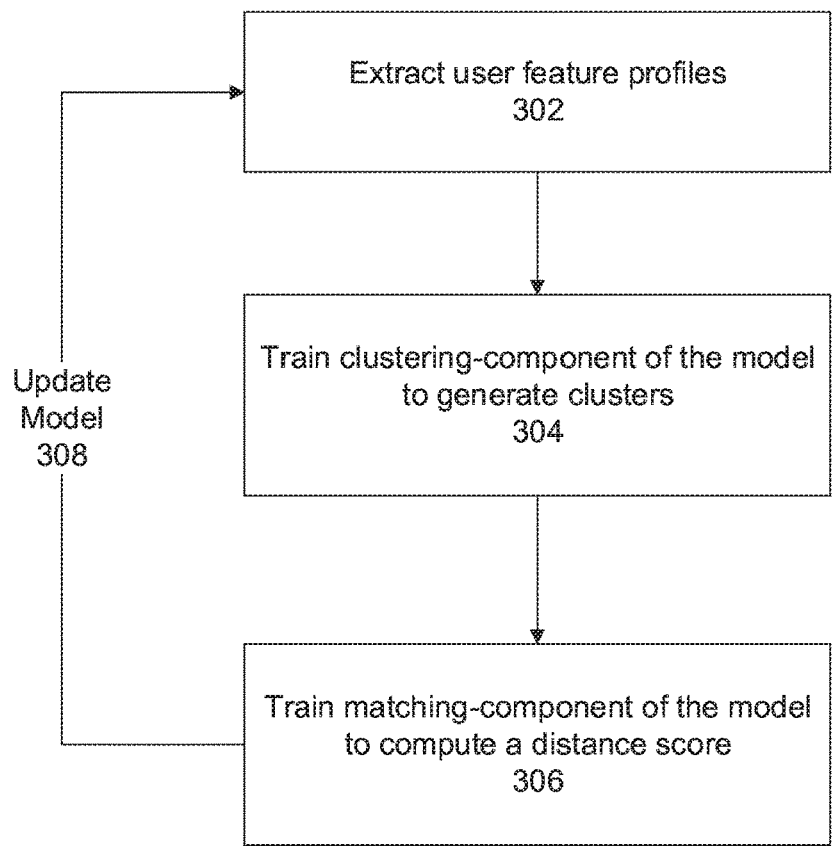
FIG. 3 is a flowchart of a method for training a model for computing scores denoting similarity between two user feature profiles created using unstructured and/or structured data extracted from a social network, in accordance with some embodiments.

Reference is now made to FIG. 1, which is a block diagram of components of a system 100 for matching users based on user feature profiles created using unstructured and/or structured data extracted from a social network and/or for training a model for computing scores denoting similarity between two user feature profiles, in accordance with some embodiments. Reference is also made to FIG. 2, which is a flowchart of a method for matching users based on user feature profiles created using unstructured and/or structured data extracted from a social network, in accordance with some embodiments. Reference is also made to FIG. 3, which is a flowchart of a method for training a model for computing scores denoting similarity between two user feature profiles created using unstructured and/or structured data extracted from a social network, in accordance with some embodiments. System 100 may implement the acts of the method described with reference to FIGS. 2-3, by processor(s) 102 of a computing device 104 executing code instructions 106A and/or 106B and/or 106C stored in a storage device 106 (also referred to as a memory and/or program store).

Computing device 104 may be implemented as, for example, a client terminal, a server, a computing cloud, a virtual server, a virtual machine, a mobile device, a desktop computer, a thin client, a Smartphone, a Tablet computer, a laptop computer, a wearable computer, glasses computer, and a watch computer.

The communication session may be established between initiating client terminal(s) 112A that trigger the request to establish the communication session, and target client terminal(s) 112B that are connected to the communication session. It is noted that the separation between client terminal(s) 112A and 112B show in FIG. 1 is for explanatory purposes. For example, the establishment of the communication session may be triggered by any client terminal, to any selected client terminal, as described herein.

Multiple architectures of system 100 based on computing device 104 may be implemented. In an exemplary implementation, computing device 104 storing code 106A and/or 106B and/or 106C, may be implemented as one or more servers (e.g., network server, web server, a computing cloud, a virtual server) that provides services (e.g., one or more of the acts described with reference to FIG. 2) to one or more client terminals 112A-B over a network 114, for example, providing the service by remote access from the respective client terminals to computing device 104 such as using a web browser, providing software services accessible using a software interface (e.g., application programming interface (API) such as for access from the social network hosted by social network server(s) 110, software development king (SDK)), providing an application for local download to the client terminal(s) 112A-B. For example, users having client terminals 112 installed in their offices (or using mobile devices) use their local client terminal to access computing device 104, which may be remotely located. The users may user their respective initiating client terminals (e.g., 112A) to request the establishment of the communication session to the target client terminal (e.g., 112B) to be performed by computing device 104, which performs one or more services as described with herein with reference to FIGS. 2-3. In another example, computing device 104 may include locally stored software (e.g., code 106A and/or 106B and/or code 106C) that performs one or more of the acts described with reference to FIGS. 2-3, for example, by one or more client terminals and/or by one or more social network server(s) 110. In yet another example, the training of the model (e.g., using code 106C) is performed by one server, and the use of the trained model is performed by a different server (that obtains the trained model from the first server and/or accesses the first server to use the trained model), where the two servers communication with one another over network 114.

Processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Data storage device 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 106 stores code 106A and/or 106B and/or 106C that implements one or more features and/or acts of the method described with reference to FIG. 2-3 when executed by processor(s) 102. Storage device 106 may store model code 106B that includes clustering-component 106B-1 and matching-component 106B-2, as described herein.

Computing device 104 may include a data repository 116 for storing data, for example, user feature profile repository 116A that stores the user feature profiles created as described herein and/or cluster repository 116B that stores the clusters created as described herein. Data repository 116 may be implemented as, for example, a memory, a local hard-drive, virtual storage, a removable storage unit, an optical disk, a storage device, and/or as a remote server and/or computing cloud (e.g., accessed using a network connection).

Network 114 may be implemented as, for example, the internet, a local area network, a virtual private network, a wireless network, a cellular network, a local bus, a point to point link (e.g., wired), and/or combinations of the aforementioned.

Computing device 104 may include a network interface 118 for connecting to network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 104 may connect using network 114 (or another communication channel, such as through a direct link (e.g., cable, wireless) and/or indirect link (e.g., via an intermediary computing unit such as a server, and/or via a storage device) with client terminal(s) 112 and/or server(s) 110, for example, for extracted features from structured and/or unstructured social network data 110A stored on social network servers(s) 110 and/or for establishing the communication session between initiating client terminal 112A and target client terminal 112B, as described herein.

Computing device 104 and/or client terminal(s) 112A-B and/or server(s) 110 include and/or are in communication with one or more physical user interfaces 108 that include a mechanism for entering data (e.g., define parameters of clustering-model) and/or for viewing data (e.g., selected user profiles for establishing the communication session), as described herein. Exemplary user interfaces 108 include, for example, one or more of, a touchscreen, a display, a keyboard, a mouse, and voice activated software using speakers and microphone.

Client terminals 112A-B and/or computing device 104 may store code for establishing the communication session, for example, code for one or more of: a chat session, a video session, a voice over network session.

Referring now back to FIG. 2, at 202, a machine learning model for computing distance scores between user feature profiles of users of a social network is provided and/or trained. Details of training the machine learning model are described with reference to FIG. 3.

At 204, a request is received from an initiating client terminal of a certain user (also referred to herein as initiating user) of a social network hosted by a social network server(s). The request may be entered, for example, using a GUI presented the initiating client terminal of the initiating user. The request is for identifying another user (also referred to herein as target user) of the social network that is similar to the certain user. For example, the certain user is a new employee of a company looking for a mentor. The mentor is to be similar to the new employee in certain ways to help guide the employee (e.g., similar job), but may also differ from the new employee in other ways that do not impact the ability to mentor (e.g., different geographical locations, different hobbies). A communication session may be established between the initiating user and the target user, as described herein.

Optionally, the initiating client terminal provides one or more user features to be used for selecting matching users (referred to herein as target and/or variable user features), for example, via the GUI. For example, user feature(s) that must be found in the matching users, and/or user feature(s) that do not matter (i.e., their value is not considered for determining the matches). Such user features may define the clusters, be irrelevant to the clusters, used to compute the distance score, and/or not used to compute the distance score (e.g., the user may select how the user features are used, optionally via the GUI). For example, the user may use the initiating client terminal to define whether the matching user is from a similar geographic location as the initiating user, a different geographic location (i.e., not the same geographic location) as the initiating user, or geographic location does not matter, and/or whether the matching user is more senior than the initiating user, less senior than the initiating user, or doesn't matter. Additional details of how the selected target and/or variable user features are used are described with reference to 304 and/or 306 of FIG. 3.

The social network may be for any users (e.g., public), for members of a certain group (e.g., employees of a company, volunteers of a non-profit, health workers of a health care organization). The social network may provide a platform for users to post content (e.g., text, images, videos), link to one another, provide feedback to each other, post user profiles of themselves, and/or participate in groups.

At 206, a cluster of which the initiating user is assigned to is accessed. The clusters are computed by the clustering-component of the model, as described herein.

Each user of the social network is assigned to one cluster. Each cluster stores feature profiles of the users of the social network. Each user feature profile is structured and includes user features extracted from one or more of: unstructured user generated text, indications of participation in groups, and structured user profiles, as described herein.

At 208, a respective distance score indicative of statistical similarity between the feature profile of the initiating user and respective features profiles of other users included in the certain cluster is computed. Optionally, a respective distance score is computed for the initiating user and each one of the users included in the cluster. The distance score is computed by the trained matching-component of the model.

The distance score of each pair (of the initiating user and another user of the cluster) may be computed as a statistical distance indicative of correlation score between the feature profiles of the users of the respective pair.

Optionally, the distance score is computed based on a subset of user features of the user feature profiles. The subset may be defined in advance (e.g., selected during the training phase, and/or manually selected and/or stored as a system setting in a memory), and/or selected by the initiating user. For example, the initiating client terminal provides (e.g., entered by the initiating user via the GUI) a target value of one or more certain user specific parameters which must be present in the matched user profiles, for example, a certain geographical location. The statistical similarity is computed by first matching records of the cluster to the user specific parameter, and then computing the scores for the matching records.

At 210, a subset of the users of the cluster may be selected according to computed distance scores. For example, a set number of ranked users is selected. For example, the top 3, 5 or other number of users having lowest distance scores (which represent the closest matching users) are selected.

The subset may be presented on the display of the initiating client terminal. The initiating user may access the social network user pages and/or profiles of the users included in the subset, for example, by clicking on a link.

At 212, a selection of one of a subset of the presented users is received from the initiating client terminal.

Alternatively to 212, at 214, an indication of no selection of any user from the presented subset is receiving from the initiating client terminal. For example, the user does not believe that any of the presented users are suitable matches, such as a suitable mentor. The user may press a 'no selection' icon in the GUI to signal that no users are being selected.

Optionally, the training labels of pairs of the certain user and each of the subset of the other users (that were presented and not selected) are updated with an indication of a maximal distance score. The clustering-component and/or matching-component of the model may be updated and/or re-trained with the updated training labels of the pairs. Features 206-212 are iterated. At 206, updated clusters computed by the updated clustering-component are accessed. At 208, updated distance scores are computed by the updated matching-component. At 210, a new subset of other users included in the newly accessed cluster is made and presented on the initiating client terminal. At 212, the initiating user may select one of the new subset, or at 214 the user does not select any from the new subset.

At 216, the communication session may be established between the initiating client, and the target client terminal of the selected user (i.e., target user). The communication session may be established automatically and/or manually. For example, a chat application is executed, a phone call is automatically connected, and/or a video conference call is automatically established.

At 218, the initiating user and/or target user provide feedback indicating quality of the match. The feedback may be provided after the establishment of the communication session, after the initiating user and the target user have communicated using the established communication session.

The feedback provides an indication of a distance score defined as a ground truth, for update of the training label of the respective pair of initiating user and target user. For example, a bad match is assigned the maximal distance score value, and a good match is assigned the minimal distance score value. There may be intermediate categories denoting intermediate quality of the match corresponding to distance score values.

At 220, the matching-component of the model may be updated based on the updated value of the training label. The manual user provided feedback helps improve the accuracy of the distance score outputted by the matching-component. The updated model is provided when processing another request, as in 202.

Referring now back to FIG. 3, at 302, user feature profiles are extracted for users of the social network. Optionally a respective user feature profile is extracted for each one of the users of the social network.

The extracted user features may be defined based on the features used for the clustering and/or for computation of the distance score.

Each user feature profile is structured, including multiple user features. For example, each structured user feature profile stores the same user feature fields, with different values assigned to the user feature fields based on extracted data.

The user features are extracted from one or more of:

Unstructured user generated text, for example, unstructured user generated content posted on personal pages of the social network by each user (e.g., text created by the user rather than being copied from somewhere else), such as comments, feelings, goals in the organization, vision for the future, reports, articles). The unstructured user generated text may be extracted, for example, using natural language processing (NLP) methods, most frequent word counts (e.g., using tf-idf (term frequency-inverse document frequency) based approaches), and/or trained machine learning models. Exemplary extracted user features include author style, and topic modelling.

Indications of participation in groups. The indication of participation in groups may be computed based on an analysis of membership in groups and/or analysis of metadata of the groups, for example, metadata denoting group membership in special interest groups, analysis of text posted to the groups (e.g., analyzed using NLP methods, most frequent word counts (e.g., using tf-idf based approaches), and/or trained machine learning models), analysis of feedback posted by other users to the user being analyzed, and unstructured activity in each respective group. Exemplary extracted user features include: expertise level and/or personal interest level, number of posts in each respective group, administrator status in groups, number of likes posted in each respective group, and number of group related keywords used in posts in the respective groups (e.g., based on keywords extracted from group tags and top tf-idf terms that characterize a certain group vs. other groups).

Structured user profiles. Features may be directly extracted from the structured user profile, for example, from values of structured defined fields of the profile. Exemplary extracted user features include, name, geographic location, educational history, work history, current work details, fields of expertise, department, role, job profile, seniority, organization level distance, title, geographic location, department, job description, and hobbies.

It is noted that the user features may be directly extracted from the unstructured and/or structured data (e.g., geographic location), computed from an analysis of the unstructured and/or structured data (e.g., author style), computed as an aggregation from multiple unstructured and/or structured data sources (e.g. seniority level, expertise level), and/or based on a heuristic mapping of words extracted from data (e.g., seniority and expertise level of the respective user computed the heuristic mapping of words extracted from an employee title associated with a profile of the respective user posted on the social network).

Unstructured data may be converted into structured data. For example, using a model to extract most relevant words (e.g., tf-idf). The most relevant words may be enriched using a pre-trained enrichment model, for example, word2vec. The user profile of each user may be represented as a vector. The vector representation of the user profiles may be allocated to respective clusters, as described herein. Distance scores may be computed according to distance between the vectors.

At 304, a clustering-component of the model is trained to generate clusters by cluster the user feature profiles using the extracted user features.

For example, for the application of matching users for professional mentoring, textual features that describe user professional skills and/or areas of expertise may be used for clustering, for example: title, job description, department, business unit, and the like.

Optionally, the user feature profiles are clustered using a supervised and/or unsupervised clustering model, for example k-means. The clustering model may define multiple adjustable parameters that are set during the training of the clustering-component, for example, a number of clusters. Optionally, the number of clusters is selected from the range 500-550 when a number of user features profiles is 40000-50000. Other number of clusters may be defined for other number of user feature profiles.

The clustering may be performed according to a selected target subset of user features. Such features may be determined as most important for matching two users. Examples of selected target user features used for clustering include words extracted from an employee title, department, business unit, and country, user identification profile, ranking in the social network, membership in groups of the social network, and words extracted from personal posted text.

Alternatively or additionally, the clustering is not performed according to a selected variable subset of user features. Such features may be determined as not relevant for matching the two users. The target subset and/or variable subset features may be selected, for example, using one or more of: manually selected by a user (e.g., via a GUI presented on a display), predefined system settings, based on results of the clustering, and/or automatically selected by code such as based on a measure such as the silhouette score). Examples of variable user features include personal interests, and geographic location.

Optionally, each user feature profile is labelled with a label obtained from the selected target subset of the user features. The label may include one or more of the selected target subset of user features. The label may be used for performing supervised clustering by supervised clustering models.

At 306, the matching-component of the model is trained to compute a distance score indicative of statistical similarity between two feature profiles. The matching component may be fed the feature profile of a target user (i.e., the initiating user when being utilized) and features profiles of another users of the same cluster.

The matching-component may be trained using a training dataset of pairs of user feature profiles extracted from common clusters. Each pair assigned a distance score label. The distance score label of each pair may be computed as a statistical distance (e.g., Euclidean distance) and/or a score indicative of amount correlation between the feature profiles of the users of the respective pair. For example, the user features selected for computation of the distance score represent a vector used to map the respective user profile in a space within the cluster. The distance between the locations in the cluster space corresponding to the mapped two user profiles is computed using the corresponding vectors.

For example, for the application of matching users for professional mentoring, textual features that describe user professional skills and/or areas of expertise may be used to compute the distance score, for example: title, job description, department, business unit, and the like (e.g., the same and/or subset of features used to cluster the user feature profiles). Alternatively or additionally, features extracted from textual data from the social network interest groups, social network posts and/or replies, social network profile (e.g., that users fill about themselfs during the onboarding process to become a mentor or a mentee), may be used.

The distance score labels may be computed by the matching-component, and/or by another process.

Optionally, the distance score is computed for a selected target subset of user features, which may be from the same subset used to compute the clusters, and/or from a different subset of user features (e.g., manually selected by a user via a GUI presented on a display), predefined system settings, and/or automatically selected by code). The selected target subset of user features may represent user features determined as most important for matching between two users. Alternatively, the distance score is not computed for a selected variable subset of user features, which may be from the same subset not used to compute the clusters, and/or from a different subset of user features (e.g., manually selected by a user (e.g., via a GUI presented on a display), predefined system settings, and/or automatically selected by code). Such variable features may be determined as not relevant for matching the two users. Alternatively, the distance score is computed for all user features of the user feature profiles.

Optionally, the distance score is defined based on feedback by the initiating user and/or the matching target user, as described herein with reference to 214 and/or 218 of FIG. 2. For example, the distance score is assigned a value denoting a maximal distance score provided by one of the users of the respective pair of users when one of the users provides feedback that the match is not good (e.g., after the communication session has been established as described with reference to 218, and/or when the user does not select any subset of users selected by the code as described with reference to 214). In another example, the distance score is assigned a value denoting minimal distance score provided by one of the users of the respective pair when one of the users provides feedback that the match is good (e.g., after the communication session has been established as described with reference to 218).

Optionally, the matching-component is implemented, for example, based on a regression model, a neural network, a set of rules, and/or support vector machine.

At 308, the model is updated, by iterating one or more of 302-306.

Optionally, the model is updated at regular time intervals (e.g., once a day, once every 3 days, once a week), in order to consider changes to the social network, for example, new users of the social network, users that quit the social network, changes to structured and/or unstructured data (e.g., users updating their personal profiles and/or updating their posted data), new posted structured and/or unstructured data, removal of old structured and/or unstructured data, and/or new activities in groups (e.g., new groups, new members in groups, members that left groups, new data posted within the group).

Alternatively or additionally, the matching-component at 306 is updated in response to user feedback that sets a new value (e.g., maximal or minimal) for the distance score, as described herein.

Alternatively or additionally, the clustering-component at 304 and/or the matching-component at 306 are re-trained (or newly trained to create a new model) based on new definitions of which user features to use and/or to exclude from the clustering and/or the computation of the distance score, for example, based on input from the initiating user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models will be developed and the scope of the term machine learning model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. A computer implemented method for training a machine learning model for establishing a communication session, comprising:
    extracting a plurality of user feature profiles for a plurality of users of a social network hosted by at least one social network server, each user feature profile being structured and including a plurality of user features extracted from unstructured user generated text, indications of participation in groups, and structured user profiles;
    training a clustering-component of the model to cluster the plurality of user feature profile s;
    training a matching-component of the model to compute a distance score indicative of statistical similarity between a feature profile of a target user and features profiles of other users of a same cluster, using a training dataset of pairs of user feature profiles extracted from common clusters, each pair assigned a distance score label;
    providing the model for:
        identifying a certain cluster of a certain user; and
        computing distance scores between the user feature profile of the certain user and other user feature profiles of other users of the certain cluster for selecting a subset of the other users;
    wherein the communication session is established between an initiating client terminal of the certain user and the target client terminal of a user selected by the initiating client terminal from the subset;
    wherein the distance score label of each pair is computed as a statistical distance indicative of correlation score between the feature profiles of the users of the respective pair, or assigned a value denoting a maximal distance score provided by one of the users of the respective pair, or assigned a value denoting minimal distance score provided by one of the users of the respective pair;
    wherein after the communication session is established, an indication of the distance score is obtained from the initiating client terminal for update of the label of the respective pair, and updating the matching-component of the model;
    wherein the clustering-component is trained to cluster user feature profiles according to a selected target subset of user features and to not cluster the user feature profiles according to a selected variable subset of user features;
    wherein the user feature profiles are clustered using an unsupervised clustering model implementation of the clustering-component having a plurality of adjustable parameters that are set during the training of the clustering-component;
    wherein the matching-component is implemented based on a regression model;
    wherein the distance scores are calculated for tens of thousands of user feature profiles;
    wherein the clustering-component is trained to cluster the tens of thousands of the user features to at least hundreds of clusters.

2. The method of claim 1, further comprising:
    receiving from the initiating client terminal, an indication of no selection of the subset of the other users included in the certain cluster;
    updating labels of pairs of the certain user and each of the subset of the other users with an indication of a maximal distance score;
    updating the clustering-component and matching-component of the model with the updated labels of the pairs;
    computing updated clusters by the updated clustering-component;
    computing updated distance scores by the updated matching-component; and
    receiving a new selection of a new subset of other users included in a new certain cluster presented on the initiating client terminal.

3. The method of claim 1, wherein the target subset of the user features are selected from the group consisting of: words extracted from an employee title, department, business unit, and country, user identification profile, ranking in the social network, membership in groups of the social network, and words extracted from personal posted text, and wherein the selected variable subset of user features include personal interests.

4. The method of claim 1, wherein each user feature profile is labelled with a label obtained from the selected target subset of the user features.

5. The method of claim 1, wherein the plurality of user feature profiles are clustered to a number of clusters selected from the range 500-550 when a number of the plurality of user features profiles is 40000-50000.

6. The method of claim 1, wherein features extracted from structured user profiles are selected from the group consisting of: department, role, job profile, and geographic location.

7. The method of claim 1, wherein features extracted from an analysis of at least one of:
unstructured user generated content posted on personal pages of the social network by users, members of users in special interest groups of the social network, and structured user profiles, are selected from the group consisting of: seniority, organization level distance, title, department, job description, author style, topic modelling, and expertise level and/or personal interest level.

8. The method of claim 1, wherein at least one feature of the feature profile is computed from an analysis of membership in special interest groups of the social network is selected from the group consisting of: unstructured activity in each respective group, number of posts in each respective group, administrator status in groups, number of likes posted in each respective group, and number of group related keywords used in posts in the respective groups.

9. The method of claim 1, wherein the feature profiles include a feature indicative of a seniority and expertise level of the respective user computed by a heuristic mapping of words extracted from an employee title associated with a profile of the respective user posted on the social network.

10. The method of claim 1, wherein the extracting, the training the clustering-component, the training the matching-component, and the providing the model are iterated at spaced apart time intervals for dynamically updating the model using updated user features.

11. A computer implemented method for establishing a communication session between an initiating client terminal and a target client terminal selected by a trained machine learning model, comprising:
receiving a request from an initiating client terminal of a certain user of a social network hosted by at least one social network server;
accessing a certain cluster computed by a clustering-component of the model, the certain cluster storing feature profiles of the certain user and other users of the social network, each user feature profile being structured and including a plurality of user features extracted from unstructured user generated text, indications of participation in groups, and structured user profiles;
computing, by a matching-component of the model, a distance score indicative of statistic al similarity between a feature profile of the certain user and the features profiles of other users included in the certain cluster;
receiving, from the initiating client terminal, a selection of one of a subset of the other users; and
establishing the communication session between the initiating client, and the target client terminal of the selected one user;
wherein the distance score label of each pair is computed as a statistical distance indicative of correlation score between the feature profiles of the users of the respective pair, or assigned a value denoting a maximal distance score provided by one of the users of the respective pair, or assigned a value denoting minimal distance score provided by one of the users of the respective pair;
wherein after the communication session is established, an indication of the distance score is obtained from the initiating client terminal for update of the label of the respective pair, and updating the matching-component of the model;
wherein the clustering-component is trained to cluster user feature profiles according to a selected target subset of user features and to not cluster the user feature profiles according to a selected variable subset of user features;
wherein the user feature profiles are clustered using an unsupervised clustering model implementation of the clustering-component having a plurality of adjustable parameters that are set during the training of the clustering-component;
wherein the matching-component is implemented based on a regression model;
wherein the distance scores are calculated for tens of thousands of user feature profiles;
wherein the clustering-component is trained to cluster the tens of thousands of the user features to at least hundreds of clusters.

12. The method of claim 11, further comprising receiving from the initiating client terminal a target value of a certain user specific parameter, and wherein the statistical similarity is computed by matching user feature profiles of the cluster to the certain user specific parameter.

13. The method of claim 11, wherein the distance score of each pair is computed as a statistical distance indicative of correlation score between the feature profiles of the users of the respective pair, or assigned a value denoting a maximal distance score provided by one of the users of the respective pair, or assigned a value denoting minimal distance score provided by one of the users of the respective pair.

14. The method of claim 13, further comprising, after establishing the communication session, obtaining an indication of the distance score from the client terminal for update of the label of the respective pair, and updating the matching-component of the model.

15. The method of claim 14, further comprising:
receiving from the initiating client terminal, an indication of no selection of the subset of the other users included in the certain cluster;
updating labels of pairs of the certain user and each of the subset of the other users with an indication of a maximal distance score;
updating the clustering-component and matching-component of the model with the updated labels of the pairs;
computing updated clusters by the updated clustering-component;
computing updated distance scores by the updated matching-component; and
receiving a new selection of a new subset of other users included in a new certain cluster presented on the initiating client terminal.

16. A system for training a machine learning model for establishing a communication session, comprising:
at least one hardware processor executing a code for:
extracting a plurality of user feature profiles for a plurality of users of a social network hosted by at least one social network server, each user feature profile being structured and including a plurality of user features extracted from unstructured user generated text, indications of participation in groups, and structured user profiles;

training a clustering-component of the model to cluster the plurality of user feature profiles;

training a matching-component of the model to compute a distance score indicative of statistical similarity between a feature profile of a target user and features profiles of other users of a same cluster, using a training dataset of pairs of user feature profiles extracted from common clusters, each pair assigned a distance score label;

providing the model for:
  identifying a certain cluster of a certain user; and
  computing distance scores between the user feature profile of the certain user and other user feature profiles of other users of the certain cluster for selecting a subset of the other users;

wherein the communication session is established between an initiating client terminal of the certain user and the target client terminal of a user selected by the initiating client terminal from the subset;

wherein the distance score label of each pair is computed as a statistical distance indicative of correlation score between the feature profiles of the users of the respective pair, or assigned a value denoting a maximal distance score provided by one of the users of the respective pair, or assigned a value denoting minimal distance score provided by one of the users of the respective pair;

wherein after the communication session is established, an indication of the distance score is obtained from the initiating client terminal for update of the label of the respective pair, and updating the matching-component of the model;

wherein the clustering-component is trained to cluster user feature profiles according to a selected target subset of user features and to not cluster the user feature profiles according to a selected variable subset of user features;

wherein the user feature profiles are clustered using an unsupervised clustering model implementation of the clustering-component having a plurality of adjustable parameters that are set during the training of the clustering-component;

wherein the matching-component is implemented based on a regression model;

wherein the distance scores are calculated for tens of thousands of user feature profiles;

wherein the clustering-component is trained to cluster the tens of thousands of the user features to at least hundreds of clusters.

* * * * *